United States Patent
Murayama et al.

(10) Patent No.: US 7,641,991 B2
(45) Date of Patent: Jan. 5, 2010

(54) MAGNETIC RECORDING MEDIUM

(75) Inventors: Yuichiro Murayama, Kanagawa (JP); Hiroshi Hashimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 11/520,621

(22) Filed: Sep. 14, 2006

(65) Prior Publication Data

US 2007/0065684 A1    Mar. 22, 2007

(30) Foreign Application Priority Data

Sep. 20, 2005   (JP)   ............... 2005-271799

(51) Int. Cl.
    *G11B 5/66*   (2006.01)
(52) U.S. Cl. ............ 428/840.6; 428/323; 428/839.1; 428/839.6; 428/838; 428/841
(58) Field of Classification Search ............ None
     See application file for complete search history.

(56) References Cited

U.S. PATENT DOCUMENTS

| | | | |
|---|---|---|---|
| 5,139,865 A | * | 8/1992 | Inaba et al. ............ 428/323 |
| 5,578,376 A | * | 11/1996 | Hashimoto et al. ....... 428/425.9 |
| 6,042,938 A | * | 3/2000 | Ikarashi et al. .......... 428/323 |
| 6,224,967 B1 | * | 5/2001 | Murayama et al. ........ 428/842.3 |
| 6,610,426 B2 | * | 8/2003 | Hashimoto et al. ....... 428/844.6 |
| 6,653,001 B2 | * | 11/2003 | Murao et al. ............. 428/845 |

FOREIGN PATENT DOCUMENTS

| | | |
|---|---|---|
| JP | 5-070757 A | 3/1993 |
| JP | 6-162487 A | 6/1994 |
| JP | 8-017036 A | 1/1996 |
| JP | 9-069222 A | 3/1997 |
| JP | 11-039639 A | 2/1999 |
| JP | 2000-319585 A | 11/2000 |
| JP | 2001-126230 A | 5/2001 |

* cited by examiner

*Primary Examiner*—D. Lawrence Tarazano
*Assistant Examiner*—Gary D. Harris
(74) *Attorney, Agent, or Firm*—Sughrue Mion, PLLC

(57) ABSTRACT

A magnetic recording medium is provided that comprises a non-magnetic support and at least one magnetic layer above the support, the magnetic layer comprising a ferromagnetic powder dispersed in a binder, and the binder comprising a polyurethane resin having a weight-average molecular weight of 200,000 to 400,000. There is also provided a magnetic recording medium that comprises a non-magnetic support, a non-magnetic layer above the support, the non-magnetic layer comprising a non-magnetic powder dispersed in a binder, and at least one magnetic layer above the non-magnetic layer, the magnetic layer comprising a ferromagnetic powder dispersed in a binder and the binder of the magnetic layer and/or the non-magnetic layer comprising a polyurethane resin having a weight-average molecular weight of 200,000 to 400,000.

16 Claims, No Drawings

MAGNETIC RECORDING MEDIUM

BACKGROUND OF THE INVENTION

1. Field of the Invention

The present invention relates to a magnetic recording medium comprising a non-magnetic support and at least one magnetic layer above the support, the magnetic layer comprising a ferromagnetic powder dispersed in a binder.

2. Description of the Related Art

Magnetic recording technology has been widely used in various fields including video, audio, and computer applications, etc. since it has the excellent advantages, which cannot be seen in other recording systems, that the medium can be used repeatedly, a signal is easily converted to electronic form and a system can be built in combination with peripheral equipment, and the signal can easily be corrected.

In general, in order to meet the demand for higher recording density in magnetic recording media for computers, etc., it is necessary to further enhance the electromagnetic conversion characteristics, and it is important to make a ferromagnetic powder finer and make the surface of the medium ultra smooth.

With regard to making a magnetic substance finer, a ferromagnetic metal powder or a ferromagnetic hexagonal ferrite powder of 0.1 μm or less has recently been used as a magnetic substance. Furthermore, in order to highly disperse the fine particle magnetic substance or a fine particulate non-magnetic powder used in a non-magnetic layer when a multi-layer structure in which the non-magnetic lower layer is provided on the surface of a support and a magnetic layer is then provided as an upper layer is employed, there has therefore been proposed a dispersion technique for carrying out planarization by introducing a hydrophilic polar group such as —SO$_3$M (M denotes hydrogen, an alkali metal, or an ammonium salt) into a binder and making a binder chain adsorb on the magnetic substance and the non-magnetic powder via the polar group.

For example, there has been proposed an adhesive composition and a binder of a magnetic recording medium employing a polyurethane resin obtained from an aliphatic isocyanate and a diol having a branched side chain (ref. JP-A-5-70757, JP-A-6-162487, JP-A-8-17036, JP-A-2000-319585, JP-A-2001-126230, JP-A-11-39639, and JP-A-9-69222; JP-A denotes a Japanese unexamined patent application publication). However, even when these binders are used, the dispersibility of the magnetic substance is insufficient; in particular, an ultrafine particle ferromagnetic powder necessary for achieving higher density cannot be dispersed sufficiently, and there is the problem that adequate electromagnetic conversion characteristics cannot be obtained.

Furthermore, when these binders are used, there are the problems that sufficient coating strength cannot be obtained and sufficient repetitive transport durability cannot be guaranteed.

BRIEF SUMMARY OF THE INVENTION

It is an object of the present invention to provide a magnetic recording medium having excellent storage stability, coating smoothness, electromagnetic conversion characteristics, and transport durability.

The problems to be solved by the present invention are solved by the following means described in (1) or (2). They are described below together with preferred embodiments (3) to (6).

(1) A magnetic recording medium comprising a non-magnetic support, and at least one magnetic layer above the support, the magnetic layer comprising a ferromagnetic powder dispersed in a binder, and the binder comprising a polyurethane resin having a weight-average molecular weight of 200,000 to 400,000, (2) a magnetic recording medium comprising a non-magnetic support, a non-magnetic layer above the support, the non-magnetic layer comprising a non-magnetic powder dispersed in a binder, and at least one magnetic layer above the non-magnetic layer, the magnetic layer comprising a ferromagnetic powder dispersed in a binder, the binder of the magnetic layer and/or the non-magnetic layer comprising a polyurethane resin having a weight-average molecular weight of 200,000 to 400,000, (3) the magnetic recording medium according to (1) or (2) above, wherein the polyurethane resin has a urethane group concentration of 2.3 mmol/g to 4.5 mmol/g, (4) the magnetic recording medium according to any one of (1) to (3) above, wherein the polyurethane resin comprises an aliphatic diol having a branched side chain with two or more carbons, (5) the magnetic recording medium according to any one of (1) to (4) above, wherein the polyurethane resin is a polyether polyurethane comprising a diol having a cyclic structure, and (6) the magnetic recording medium according to any one of (1) to (5) above, wherein the ferromagnetic powder is an acicular ferromagnetic substance having a major axis length of 20 to 50 nm, a tabular magnetic substance having a particle size of 10 to 50 nm, or a spherical or ellipsoidal magnetic substance having a diameter of 10 to 50 nm.

BEST MODE FOR CARRYING OUT THE INVENTION

1. Binder

The magnetic recording medium of the present invention is a magnetic recording medium comprising a non-magnetic support and at least one magnetic layer above the support, the magnetic layer comprising a ferromagnetic powder dispersed in a binder, and the binder comprising a polyurethane resin having a weight-average molecular weight of 200,000 to 400,000.

Furthermore, the magnetic recording medium of the present invention preferably comprises, between the non-magnetic support and the magnetic layer, a non-magnetic layer comprising a non-magnetic powder dispersed in a binder.

In the present invention, the polyurethane resin used as the binder has a weight-average molecular weight of 200,000 to 400,000. If the weight-average molecular weight is less than 200,000, the storage stability degrades. Furthermore, if it is greater than 400,000, sufficient dispersibility cannot be obtained.

A preferred weight-average molecular weight of a polyurethane resin used as the binder is 220,000 to 340,000.

The present invention employs a polyurethane resin having a higher molecular weight than a polyurethane resin used as a binder in a conventional magnetic recording medium, and enables a magnetic substance to be highly dispersed. As a result, a magnetic recording medium employing this binder has excellent electromagnetic conversion characteristics as well as excellent transport durability and storage stability.

It is surmised that, by the use of a polyurethane resin having a weight-average molecular weight of 200,000 to 400,000, which is higher than conventional, adsorption on the magnetic substance can be enhanced, thus exhibiting an effect in highly dispersing the magnetic substance.

In order to introduce into a polyurethane resin a carboxylic acid, a sulfonic acid, a metal salt thereof, etc., which are adsorbing functional groups for making the binder adsorb on the magnetic substance, the use of a glycol or a polyol having such an adsorbing functional group is generally known. In such a method, if the molecular weight of the polyurethane is low, there is a possibility that the adsorbing functional group will not be introduced into a large number of molecules. As a result, the number of molecules having an adsorbing functional group necessary for dispersion is in practice small, and sufficient dispersibility cannot be obtained. It has been found that the use of a polyurethane resin having a higher than conventional molecular weight can solve the above-mentioned problems and, in particular, exhibits an effect in highly dispersing an ultrafine particle magnetic substance, and the present invention has thus been accomplished.

Furthermore, in the present invention, a fine particle magnetic substance can be highly dispersed with a smaller amount than conventional of polyurethane resin, and since the magnetic substance can be highly dispersed without degrading the packing ratio, excellent electromagnetic conversion characteristics can be guaranteed.

In the present invention, the fine particle magnetic substance can be dispersed with 70 to 80% of the conventional amount of polyurethane resin.

Moreover, in the present invention, since the polyurethane resin has a high molecular weight, the coating strength is higher than the conventional polyurethane resin, and the repetitive, transport durability is excellent. Furthermore, in the present invention, since the polyurethane resin has a high molecular weight, the amount of low molecular weight component is smaller than the conventional polyurethane resin, and there are few problems caused by the low molecular weight component depositing on the surface of the magnetic layer due to long-term storage and degrading the durability, etc.

In the present invention, it is preferable for the proportion of polyurethane resin having a weight-average molecular weight of 5,000 or less to be no greater than 1.0%, and it is more preferable for polyurethane resin having a weight-average molecular weight of 5,000 or less to be absent. The proportion of polyurethane resin having a weight-average molecular weight of 5,000 or less may be measured by GPC (gel permeation chromatography).

As an example of a method of controlling the weight-average molecular weight in the above-mentioned range, the method below can be cited.

The weight-average molecular weight may be adjusted by fine adjustment of the molar ratio of OH groups derived from a polyol and NCO groups derived from a diisocyanate, or by the use of a reaction catalyst.

Examples of the reaction catalyst include an organometallic compound such as dibutyl tin dilaurate, a tertiary amine such as triethylamine or triethylenediamine, and a metal salt such as potassium acetate or zinc stearate. Among them dibutyl tin dilaurate is preferable.

With regard to another method, there is a method in which the weight-average molecular weight is controlled by adjusting the solids content, reaction temperature, reaction solvent, reaction time, etc. during a reaction.

In the present invention, the weight-average molecular weight (Mw)/number-average molecular weight (Mn) ratio Mw/Mn (molecular weight distribution) of the polyurethane resin is preferably 1.0 to 2.5, more preferably 1.5 to 2.3, and yet more preferably 1.8 to 2.2. It is preferable for Mw/Mn to be in the above-mentioned range since little component distribution occurs and good dispersibility can be obtained.

The urethane group concentration is preferably 2.3 mmol/g to 4.5 mmol/g, and more preferably 2.5 mmol/g to 4.0 mmol/g.

It is preferable for the urethane group concentration to be in the above-mentioned range since the coating has a satisfactory glass transition temperature (Tg) and good durability can be obtained. Furthermore, good solvent solubility can be obtained, and the dispersibility is not degraded, which is preferable. Moreover, it is preferable for the urethane group concentration to be no greater than 4.5 mmol/g since the polyol content can be increased, it is easy to control the molecular weight, and it is advantageous in terms of synthesis.

The polyurethane is a polymer obtained by a reaction between a polyol and a polyisocyanate. The polyol and the polyisocyanate are described in detail below.

Polyol

In the present invention, the polyurethane resin preferably comprises an aliphatic diol having a branched side chain with two or more carbons. It is also preferable for it to comprise a diol having a cyclic structure.

In the present invention, as the polyol, known polyols such as polyester polyol, polyether polyol, polyether ester polyol, polycarbonate polyol, polyolefin polyol, or dimer diol may be used as necessary. The polyol may be used singly or in a combination of two or more types. In the present invention, it is preferable to use two or more types of polyols.

Preferred examples thereof include polyester polyol and polyether polyol.

As a dibasic acid component that can be used for the polyester polyol, adipic acid, azelaic acid, phthalic acid, Na sulfoisophthalate, etc. are preferable. Examples of the diol include 1,4-butanediol, cyclohexanedimethanol, 2,2-dimethyl-1,3-propanediol, 2-ethyl-2-butyl-1,3-propanediol, and 3-methyl-1,5-pentadiol, and those having a branched side chain, such as 2,2-dimethyl-1,3-propanediol, 2-ethyl-2-butyl-1,3-propanediol, and 3-methyl-1,5-pentadiol, are preferable.

With regard to the polyether polyol, those having a cyclic structure, such as bisphenol A polypropylene oxide adduct and bisphenol A polyethylene oxide adduct, are preferable.

Other than the above-mentioned polyols, known short chain diols having a molecular weight of on the order of 200 to 500 may be used as a chain extending agent if necessary. Among them, an aliphatic diol having a branched side chain with two or more carbons or an ether compound having a cyclic structure is preferable.

Examples of the aliphatic diol having a branched side chain with two or more carbons are listed below.

2-Methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5- pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, 5-butyl-1,9-nonanediol, etc.

Among them, 2-ethyl-2-butyl-1,3-propanediol and 2,2-diethyl-1,3-propanediol are preferable.

Examples of the ether compound having a cyclic structure include bisphenol A ethylene oxide adduct, bisphenol A propylene oxide adduct, hydrogenated bisphenol A ethylene oxide adduct, hydrogenated bisphenol A propylene oxide adduct, and spiro glycol. Among them, bisphenol A propylene oxide adduct is preferable.

Polyisocyanate

In the present invention, it is preferable to use a diisocyanate as the polyisocyanate. A known diisocyanate may be used.

Preferred examples thereof include TDI (tolylene diisocyanate), MDI (diphenylmethane diisocyanate), p-phenylene diisocyanate, o-phenylene diisocyanate, m-phenylene diisocyanate, xylylene diisocyanate, hydrogenated xylylene diisocyanate, and isophorone diisocyanate.

The polyurethane used in the present invention may contain a polar group. Preferred examples of the polar group include —$SO_3M$, —$OSO_3M$, —$PO_3M_2$, and —COOM. Among them, —$SO_3M$ and —$OSO_3M$ are more preferable. M denotes a hydrogen atom, an alkali metal, or ammonium.

The content of the polar group in the polyurethane is preferably $1\times10^{-5}$ eq/g to $2\times10^{-4}$ eq/g. It is preferable for the content of the polar group to be in the above-mentioned range since adsorption onto the magnetic substance and solubility in a solvent are good, and the dispersibility improves.

The polyurethane resin may contain an OH group. The number of OH groups per molecule is preferably 2 to 20, and more preferably 3 to 15. It is preferable for the number of OH groups to be in the above-mentioned range since the reactivity with an isocyanate curing agent is good, the coating strength is good, the solubility in a solvent is good, and desirable dispersibility can be obtained.

The glass transition temperature (Tg) of the polyurethane is preferably 80° C. to 200° C., and more preferably 90° C. to 160° C. It is preferable for it to be in the above-mentioned range since the coating strength does not deteriorate at high temperature and durability and storage stability are good. It is also preferable since the calender moldability is good and the electromagnetic conversion characteristics improve.

The modulus of elasticity of the polyurethane resin is preferably 1 to 3 GPa. If the modulus of elasticity is in the above-mentioned range, there is little problem with the coating being tacky. Furthermore, the moldability of the magnetic layer in a calendering step is good, and sufficient smoothness can be obtained.

In the present invention, a combination with another resin may be used as the binder for the magnetic layer. Examples of the other resin include a polyester resin, a polyamide resin, a vinyl chloride resin, an acrylic resin formed by copolymerization of styrene, acrylonitrile, methyl methacrylate, etc., a cellulose resin such as nitrocellulose, an epoxy resin, a phenoxy resin, and a polyvinylalkyral resin such as polyvinylacetal or polyvinylbutyral, and they may be used singly or as a mixture of a plurality of resins. Among them the vinyl chloride resin, the acrylic resin, and the cellulose resin are preferable.

As the vinyl chloride resin, a copolymer of a vinyl chloride monomer and various types of monomer may be used. Examples of the comonomer include fatty acid vinyl esters such as vinyl acetate and vinyl propionate, acrylates and methacrylates such as methyl (meth)acrylate, ethyl (meth)acrylate, isopropyl (meth)acrylate, butyl (meth)acrylate, and benzyl (meth)acrylate, alkyl allyl ethers such as allyl methyl ether, allyl ethyl ether, allyl propyl ether, and allyl butyl ether, and others such as styrene, α-methylstyrene, vinylidene chloride, acrylonitrile, ethylene, butadiene, and acrylamide.

Furthermore, examples of a comonomer having a functional group include vinyl alcohol, 2-hydroxyethyl (meth)acrylate, polyethylene glycol (meth)acrylate, 2-hydroxypropyl (meth)acrylate, 3-hydroxypropyl (meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl (meth)acrylate, allyl glycidyl ether, phosphoethyl (meth)acrylate, sulfoethyl (meth)acrylate, p-styrenesulfonic acid, and Na salts and K salts thereof.

The proportion of the vinyl chloride monomer in the vinyl chloride resin is preferably 60 to 95 wt %. It is preferable if it is in this range since the mechanical strength improves, the solvent solubility is high, and good dispersibility can be obtained due to desirable solution viscosity.

The vinyl chloride resin preferably has an absorbing functional group (polar group).

A preferred degree of polymerization is 200 to 600, and more preferably 240 to 450. It is preferable if the degree of polymerization is in this range since the mechanical strength is high and good dispersibility can be obtained due to desirable solution viscosity.

In order to improve the dispersibility of the ferromagnetic powder and the non-magnetic powder, the binder preferably has a functional group (polar group) that is adsorbed on the surface of the powders. Preferred examples of the functional group include —$SO_3M$, —$SO_4M$, —$PO(OM)_2$, —$OPO(OM)_2$, —COOM, >$NSO_3M$, >$NRSO_3M$, —$NR^1R^2$, and —$N^+R^1R^2R^3X^-$. M denotes a hydrogen atom or an alkali metal such as Na or K, R denotes an alkylene group, $R^1$, $R^2$, and $R^3$ denote alkyl groups, hydroxyalkyl groups, or hydrogen atoms, and X denotes a halogen such as Cl or Br.

When the vinyl chloride resin is used in combination, with regard to a method for introducing these functional groups, a monomer containing the above-mentioned functional group may be copolymerized, or after the vinyl chloride resin is formed by copolymerization, the functional group may be introduced by a polymer reaction.

In the present invention, the binder preferably comprises a polyurethane resin having a weight-average molecular weight of 200,000 to 400,000 at least 50 wt % of the entire binder, more preferably at least 60 wt %, and yet more preferably at least 80 wt %.

2. Ferromagnetic Powder

The magnetic recording medium of the present invention preferably employs as a ferromagnetic powder an acicular ferromagnetic substance having a major axis length of 20 to 50 nm, a tabular magnetic substance having a particle size of 10 to 50 nm, or a spherical or ellipsoidal magnetic substance having a diameter of 10 to 50 nm. Each thereof is explained below.

(1) Acicular Ferromagnetic Substance

As the ferromagnetic powder used in the magnetic recording medium of the present invention, an acicular ferromagnetic substance having a major axis length of 20 to 50 nm may be used. Examples of the acicular ferromagnetic substance include an acicular ferromagnetic metal powder such as a cobalt-containing ferromagnetic iron oxide or a ferromagnetic alloy powder; the BET specific surface area ($S_{BET}$) is preferably 40 to 80 m²/g, and more preferably 50 to 70 m²/g. The crystallite size is preferably 12 to 25 nm, more preferably 13 to 22 nm, and particularly preferably 14 to 20 nm. The major axis length is preferably 20 to 50 nm, and more preferably 20 to 40 nm.

Examples of the ferromagnetic metal powder include yttrium-containing Fe, Fe—Co, Fe—Ni, and Co—Ni—Fe, and the yttrium content in the ferromagnetic metal powder is preferably 0.5 to 20 atom % as the yttrium atom/iron atom ratio Y/Fe, and more preferably 5 to 10 atom %. It is preferable if the yttrium content is in such a range since the ferromagnetic metal powder has a high σs value, and good magnetic properties can be obtained. Furthermore, since the iron content also becomes appropriate, it is possible to obtain good magnetic properties and electromagnetic conversion characteristics, which is preferable. Furthermore, it is also possible for aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium, bismuth, etc. to be present at 20 atom % or less relative to 100 atom % of iron. It is also possible for the ferromagnetic metal powder to contain a small amount of water, a hydroxide, or an oxide.

One example of a process for producing the ferromagnetic metal powder of the present invention, into which cobalt or yttrium has been introduced, is illustrated below.

For example, an iron oxyhydroxide obtained by blowing an oxidizing gas into an aqueous suspension in which a ferrous salt and an alkali have been mixed can be used as a starting material.

This iron oxyhydroxide is preferably of the α-FeOOH type, and with regard to a production process therefor, there is a first production process in which a ferrous salt is neutralized with an alkali hydroxide to form an aqueous suspension of $Fe(OH)_2$, and an oxidizing gas is blown into this suspension to give acicular α-FeOOH. There is also a second production process in which a ferrous salt is neutralized with an alkali carbonate to form an aqueous suspension of $FeCO_3$, and an oxidizing gas is blown into this suspension to give spindle-shaped α-FeOOH. Such an iron oxyhydroxide is preferably obtained by reacting an aqueous solution of a ferrous salt with an aqueous solution of an alkali to give an aqueous solution containing ferrous hydroxide, and then oxidizing this with air, etc. In this case, the aqueous solution of the ferrous salt may contain an Ni salt, a salt of an alkaline earth element such as Ca, Ba, or Sr, a Cr salt, a Zn salt, etc., and by selecting these salts appropriately the particle shape (axial ratio), etc. can be adjusted.

As the ferrous salt, ferrous chloride, ferrous sulfate, etc. are preferable. As the alkali, sodium hydroxide, aqueous ammonia, ammonium carbonate, sodium carbonate, etc. are preferable. With regard to salts that can be present at the same time, chlorides such as nickel chloride, calcium chloride, barium chloride, strontium chloride, chromium chloride, and zinc chloride are preferable.

In a case where cobalt is subsequently introduced into the iron, before introducing yttrium, an aqueous solution of a cobalt compound such as cobalt sulfate or cobalt chloride is mixed and stirred with a slurry of the above-mentioned iron oxyhydroxide. After the slurry of iron oxyhydroxide containing cobalt is prepared, an aqueous solution containing a yttrium compound is added to this slurry, and they are stirred and mixed.

In the present invention, neodymium, samarium, praseodymium, lanthanum, gadolinium etc. can be introduced into the ferromagnetic metal powder of the present invention as well as yttrium. They can be introduced using a chloride such as neodymium chloride, samarium chloride, praseodymium chloride, or lanthanum chloride or a nitrate salt such as neodymium nitrate or gadolinium nitrate, and they can be used in a combination of two or more types.

The coercive force (Hc) of the ferromagnetic metal powder is preferably 159.2 to 238.8 kA/m (2,000 to 3,000 Oe), and more preferably 167.2 to 230.8 kA/m (2,100 to 2,900 Oe).

The saturation magnetic flux density is preferably 150 to 300 mT (1,500 to 3,000 G), and more preferably 160 to 290 mT (1,600 to 2,900 G). The saturation magnetization (σs) is preferably 100 to 170 A·m²/kg (emu/g), and more preferably 110 to 160 A·m²/kg (emu/g).

The SFD (switching field distribution) of the magnetic substance itself is preferably low, and 0.8 or less is preferred. When the SFD is 0.8 or less, the electromagnetic conversion characteristics become good, the output becomes high, the magnetization reversal becomes sharp with a small peak shift, and it is suitable for high-recording-density digital magnetic recording. In order to narrow the Hc distribution, there is a technique of improving the particle size distribution of goethite, a technique of using monodispersed α-$Fe_2O_3$, and a technique of preventing sintering between particles, etc. in the ferromagnetic metal powder.

(2) Tabular Magnetic Substance

The tabular magnetic substance having a particle size of 10 to 50 nm that can be used in the present invention is preferably a hexagonal ferrite powder.

Examples of the hexagonal ferrite include substitution products of barium ferrite, strontium ferrite, lead ferrite, and calcium ferrite, and Co substitution products. More specifically, magnetoplumbite type barium ferrite and strontium ferrite, magnetoplumbite type ferrite with a particle surface coated with a spinel, magnetoplumbite type barium ferrite and strontium ferrite partially containing a spinel phase, etc., can be cited. In addition to the designated atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, or Zr may be included. In general, those to which Co—Zn, Co—Ti, Co—Ti—Zr, Co—Ti—Zn, Ni—Ti—Zn, Nb—Zn—Co, Sb—Zn—Co, Nb—Zn, etc. have been added can be used. Characteristic impurities may be included depending on the starting material and the production process.

The particle size is preferably 10 to 50 nm as a hexagonal plate size. When a magnetoresistive head is used for playback, the plate size is preferably equal to or less than 40 nm so as to reduce noise. It is preferable if the plate size is in such a range, since stable magnetization can be expected due to the absence of thermal fluctuations, and since noise is reduced it is suitable for high density magnetic recording.

The tabular ratio (plate size/plate thickness) is preferably 1 to 15, and more preferably 2 to 7. It is preferable if the tabular ratio is in such a range since adequate orientation can be obtained, and noise due to inter-particle stacking decreases. The $S_{BET}$ of a powder having a particle size within this range is usually 10 to 200 m²/g. The specific surface area substantially coincides with the value obtained by calculation using the plate size and the plate thickness. The crystallite size is preferably 5 to 45 nm, and more preferably 10 to 35 nm. The plate size and the plate thickness distributions are preferably as narrow as possible. Although it is difficult, the distribution can be expressed using a numerical value by randomly measuring 500 particles on a TEM photograph of the particles. The distribution is not a regular distribution in many cases, but the standard deviation calculated with respect to the average size is σ/average size=0.1 to 2.0. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the magnetic substance can be adjusted so as to be on the order of 39.8 to 398 kA/m (500 to 5,000 Oe). A higher Hc is advantageous for high-density recording, but it is restricted by the capacity of the recording head. It is usually on the order of 63.7 to 318.4 kA/m (800 to 4,000 Oe), but is preferably at least 119.4 kA/m (1,500 Oe) and at most 278.6 kA/m (3,500 Oe). When the saturation magnetization of the head exceeds 1.4 T, it is preferably 159.2 kA/m (2,000 Oe) or higher.

The Hc can be controlled by the particle size (plate size, plate thickness), the type and amount of element included, the element replacement sites, the conditions used for the particle formation reaction, etc. The saturation magnetization (σs) is 40 to 80 A·m²/kg (40 to 80 emu/g). A higher σs is preferable, but there is a tendency for it to become lower when the particles become finer. In order to improve the σs, making a composite of magnetoplumbite ferrite with spinel ferrite, selecting the types of element included and their amount, etc. are well known. It is also possible to use a W type hexagonal ferrite.

When dispersing the magnetic substance, the surface of the magnetic substance can be treated with a material that is compatible with a dispersing medium and the polymer. With regard to a surface-treatment agent, an inorganic or organic compound can be used. Representative examples include oxides and hydroxides of Si, Al, P, etc., and various types of silane coupling agents and various kinds of titanium coupling agents. The amount thereof is preferably 0.1% to 10% based on the magnetic substance. The pH of the magnetic substance is also important for dispersion. It is usually on the order of 4 to 12, and although the optimum value depends on the dispersing medium and the polymer, it is selected from on the order of 6 to 10 from the viewpoints of chemical stability and storage properties of the magnetic recording medium. The moisture contained in the magnetic substance also influences the dispersion. Although the optimum value depends on the dispersing medium and the polymer, it is usually selected from 0.01% to 2.0%.

With regard to a production method for the ferromagnetic hexagonal ferrite powder, there are:

glass crystallization method (1) in which barium oxide, iron oxide, a metal oxide that replaces iron, and boron oxide, etc. as glass forming materials are mixed so as to give a desired ferrite composition, then melted and rapidly cooled to give an amorphous substance, subsequently reheated, then washed and ground to give a barium ferrite crystal powder;

hydrothermal reaction method (2) in which a barium ferrite composition metal salt solution is neutralized with an alkali, and after a by-product is removed, it is heated in a liquid phase at 100° C. or higher, then washed, dried and ground to give a barium ferrite crystal powder; and co-precipitation method (3) in which a barium ferrite composition metal salt solution is neutralized with an alkali, and after a by-product is removed, it is dried and treated at 1,100° C. or less, and ground to give a barium ferrite crystal powder, etc., but a hexagonal ferrite used in the present invention may be produced by any method.

(3) Spherical or Ellipsoidal Magnetic Substance

The spherical or ellipsoidal magnetic substance is preferably an iron nitride-based ferromagnetic powder containing $Fe_{16}N_2$ as a main phase. It may comprise, in addition to Fe and N atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, or Nb. The content of N relative to Fe is preferably 1.0 to 20.0 atom %.

The iron nitride is preferably spherical or ellipsoidal, and the major axis length/minor axis length axial ratio is preferably 1 to 2. The BET specific surface area ($S_{BET}$) is preferably 30 to 100 m²/g, and more preferably 50 to 70 m²/g. The crystallite size is preferably 12 to 25 nm, and more preferably 13 to 22 nm.

The saturation magnetization σs is preferably 50 to 200 A·m²/kg (emu/g), and more preferably 70 to 150 A·m²/kg (emu/g).

Additives may be added as necessary to the magnetic layer of the present invention. Examples of the additives include an abrasive, a lubricant, a dispersant/dispersion adjuvant, a fungicide, an antistatic agent, an antioxidant, a solvent, and carbon black.

Examples of these additives include molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, a polyphenyl ether; aromatic ring-containing organic phosphonic acids such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, tolylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid, and alkali metal salts thereof; alkylphosphonic acids such as octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, and isoeicosylphosphonic acid, and alkali metal salts thereof; aromatic phosphates such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, tolyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate, and alkali metal salts thereof; alkyl phosphates such as octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, and isoeicosyl phosphate, and alkali metal salts thereof; and alkyl sulfonates and alkali metal salts thereof; fluorine-containing alkyl sulfates and alkali metal salts thereof; monobasic fatty acids that have 10 to 24 carbons, may contain an unsaturated bond, and may be branched, such as lauric acid, myristic acid, palmitic acid, stearic acid, behenic acid, oleic acid, linoleic acid, linolenic acid, elaidic acid, and erucic acid, and metal salts thereof; mono-fatty acid esters, di-fatty acid esters, and poly-fatty acid esters such as butyl stearate, octyl stearate, amyl stearate, isooctyl stearate, octyl myristate, butyl laurate, butoxyethyl stearate, anhydrosorbitan monostearate, anhydrosorbitan distearate, and anhydrosorbitan tristearate that are formed from a monobasic fatty acid that has 10 to 24 carbons, may contain an unsaturated bond, and may be branched, and any one of a mono- to hexa-hydric alcohol that has 2 to 22 carbons, may contain an unsaturated bond, and may be branched, an alkoxy alcohol that has 12 to 22 carbons, may have an unsaturated bond, and may be branched, and a mono alkyl ether of an alkylene oxide polymer; fatty acid amides having 2 to 22 carbons; aliphatic amines having 8 to 22 carbons; etc. Other than the above-mentioned hydrocarbon groups, those having an alkyl, aryl, or aralkyl group that is substituted with a group other than a hydrocarbon group, such as a nitro group, F, Cl, Br, or a halogen-containing hydrocarbon such as $CF_3$, $CCl_3$, or $CBr_3$ can also be used.

Furthermore, there are a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid or a sulfate ester group; and an amphoteric surfactant such as an amino acid, an aminosulfonic acid, a sulfate ester or a phosphate ester of an amino alcohol, or an alkylbetaine. Details of these surfactants are described in 'Kaimen-kasseizai Binran' (Surfactant Handbook) (published by Sangyo Tosho Publishing).

These dispersants, lubricants, etc. need not always be pure and may contain, in addition to the main component, an impurity such as an isomer, an unreacted material, a by-product, a decomposition product, or an oxide. However, the impurity content is preferably 30 wt % or less, and more preferably 10 wt % or less.

Specific examples of these additives include NAA-102, hardened castor oil fatty acid, NAA-42, Cation SA, Nymeen L-201, Nonion E-208, Anon BF, and Anon LG, (produced by Nippon Oil & Fats Co., Ltd.); FAL-205, and FAL-123 (produced by Takemoto Oil & Fat Co., Ltd); Enujelv OL (produced by New Japan Chemical Co., Ltd.); TA-3 (produced by Shin-Etsu Chemical Industry Co., Ltd.); Amide P (produced by Lion Armour); Duomin TDO (produced by Lion Corporation); BA-41G (produced by The Nisshin Oilli O Group, Ltd.); and Profan 2012E, Newpol PE 61, and Ionet MS-400 (produced by Sanyo Chemical Industries, Ltd.).

In the present invention, an organic solvent used for the magnetic layer can be a known organic solvent. As the organic solvent, a ketone such as acetone, methyl ethyl ketone, methyl isobutyl ketone, diisobutyl ketone, cyclohexanone, or isophorone, an alcohol such as methanol, ethanol, propanol, butanol, isobutyl alcohol, isopropyl alcohol, or methylcyclohexanol, an ester such as methyl acetate, butyl acetate, isobutyl acetate, isopropyl acetate, ethyl lactate, or glycol acetate, a glycol ether such as glycol dimethyl ether, glycol monoethyl ether, or dioxane, an aromatic hydrocarbon such as benzene, toluene, xylene, or cresol, a chlorohydrocarbon such as methylene chloride, ethylene chloride, carbon tetrachloride, chloroform, ethylene chlorohydrin, chlorobenzene, or dichlorobenzene, N,N-dimethylformamide, hexane, tetrahydrofuran, etc. can be used at any ratio.

These organic solvents do not always need to be 100% pure, and may contain an impurity such as an isomer, an unreacted compound, a by-product, a decomposition product, an oxide, or moisture in addition to the main component. The content of these impurities is preferably 30% or less, and more preferably 10% or less. The organic solvent used in the present invention is preferably the same type for both the magnetic layer and a non-magnetic layer. However, the amount added may be varied. The coating stability is improved by using a high surface tension solvent (cyclohexanone, dioxane, etc.) for the non-magnetic layer; more specifically, it is important that the arithmetic mean value of the surface tension of the magnetic layer (upper layer) solvent composition is not less than that for the surface tension of the non-magnetic layer solvent composition. In order to improve the dispersibility, it is preferable for the polarity to be somewhat strong, and the solvent composition preferably contains 50% or more of a solvent having a permittivity of 15 or higher. The solubility parameter is preferably 8 to 11.

The type and the amount of the dispersant, lubricant, and surfactant used in the magnetic layer of the present invention can be changed as necessary in the magnetic layer and a non-magnetic layer, which will be described later.

For example, although not limited to only the examples illustrated here, the dispersant has the property of adsorbing or bonding via its polar group, and it is surmised that the dispersant adsorbs or bonds, via the polar group, to mainly the surface of the ferromagnetic powder in the magnetic layer and mainly the surface of the non-magnetic powder in the non-magnetic layer, which will be described later, and once adsorbed it is hard to desorb an organophosphorus compound from the surface of a metal, a metal compound, etc. Therefore, since in the present invention the surface of the ferromagnetic powder or the surface of a non-magnetic powder, which will be described later, are in a state in which they are covered with an alkyl group, an aromatic group, etc., the affinity of the ferromagnetic powder or the non-magnetic powder toward the binder resin component increases and, furthermore, the dispersion stability of the ferromagnetic powder or the non-magnetic powder is also improved. With regard to the lubricant, since it is present in a free state, its exudation to the surface is controlled by using fatty acids having different melting points for the non-magnetic layer and the magnetic layer or by using esters having different boiling points or polarity. The coating stability can be improved by regulating the amount of surfactant added, and the lubrication effect can be improved by increasing the amount of lubricant added to the non-magnetic layer. Furthermore, all or a part of the additives used in the present invention may be added to a magnetic coating solution or a non-magnetic coating solution at any stage of its preparation. For example, the additives may be blended with a ferromagnetic powder prior to a kneading step, they may be added in a step of kneading a ferromagnetic powder, a binder, and a solvent, they may be added in a dispersing step, they may be added after dispersion, or they may be added immediately prior to coating.

The magnetic layer of the present invention may contain carbon black as necessary.

The type of carbon black that can be used includes furnace black for rubber, thermal black for rubber, carbon black for coloring, acetylene black, etc. The carbon black of the magnetic layer should have optimized characteristics as follows depending on desired effects, and this may be achieved by using a combination thereof.

The specific surface area of the carbon black is preferably 100 to 500 $m^2/g$, and more preferably 150 to 400 $m^2/g$, and the DBP oil absorption thereof is preferably 20 to 400 mL/100 g, and more preferably 30 to 200 mL/100 g. The average particle size of the carbon black is preferably 5 to 80 nm, more preferably 10 to 50 nm, and yet more preferably 10 to 40 nm. The pH of the carbon black is preferably 2 to 10, the water content thereof is preferably 0.1% to 10%, and the tap density is preferably 0.1 to 1 g/mL.

Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, MA-600, MA-230,

4000, and #4010 (manufactured by Mitsubishi Chemical Corporation), CONDUCTEX SC, RAVEN 8800, 8000, 7000, 5750, 5250, 3500, 2100, 2000, 1800, 1500, 1255, and 1250 (manufactured by Columbian Carbon Co.), and Ketjen Black EC (manufactured by Akzo).

The carbon black may be surface treated using a dispersant or grafted with a resin, or part of the surface thereof may be converted into graphite. Prior to adding carbon black to a coating solution, the carbon black may be predispersed with a binder. The carbon black that can be used in the present invention can be selected by referring to, for example, the 'Kabon Burakku Handobukku' (Carbon Black Handbook) (edited by the Carbon Black Association of Japan).

The carbon black may be used singly or in a combination of different types thereof. When the carbon black is used, it is preferably used in an amount of 0.1 to 30 wt % based on the weight of the ferromagnetic substance. The carbon black has the functions of preventing static charging of the magnetic layer, reducing the coefficient of friction, imparting light-shielding properties, and improving the film strength. Such functions vary depending upon the type of carbon black. Accordingly, it is of course possible in the present invention to appropriately choose the type, the amount and the combination of carbon black for the magnetic layer according to the intended purpose on the basis of the above mentioned various properties such as the particle size, the oil absorption, the electrical conductivity, and the pH value, and it is better if they are optimized for the respective layers.

3. Non-magnetic Layer

The magnetic recording medium of the present invention may comprise at least one non-magnetic layer comprising a non-magnetic powder dispersed in a binder between the non-magnetic support and the magnetic layer. When there is a non-magnetic layer, the same binder as that used in the magnetic layer may be used in the non-magnetic layer.

The non-magnetic powder that can be used in the non-magnetic layer may be an inorganic substance or an organic substance. The non-magnetic layer may further include carbon black as necessary together with the non-magnetic powder.

Non-magnetic Powder

The non-magnetic layer may employ a magnetic powder as long as the lower layer is substantially non-magnetic, but preferably employs a non-magnetic powder.

The non-magnetic powder that can be used in the non-magnetic layer may be an inorganic substance or an organic substance. It is also possible to use carbon black, etc. Examples of the inorganic substance include a metal, a metal oxide, a metal carbonate, a metal sulfate, a metal nitride, a metal carbide, and a metal sulfide.

Specific examples thereof include a titanium oxide such as titanium dioxide, cerium oxide, tin oxide, tungsten oxide, ZnO, $ZrO_2$, $SiO_2$, $Cr_2O_3$, α-alumina having an α-component proportion of 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide, and they can be used singly or in a combination of two or more types. α-iron oxide dr a titanium oxide is preferable.

The form of the non-magnetic powder may be any one of acicular, spherical, polyhedral, and tabular.

The crystallite size of the non-magnetic powder is preferably 4 nm to 1 µm, and more preferably 40 to 100 nm. When the crystallite size is in the range of 4 nm to 1 µm, there are no problems with dispersion and a suitable surface roughness is obtained.

The average particle size of these non-magnetic powders is preferably 5 nm to 2 µm, but it is possible to combine non-magnetic powders having different average particle sizes as necessary, or widen the particle size distribution of a single non-magnetic powder, thus producing the same effect. The average particle size of the non-magnetic powder is particularly preferably 10 to 200 nm. It is preferable if it is in the range of 5 nm to 2 µm, since good dispersibility and a suitable surface roughness can be obtained.

The specific surface area of the non-magnetic powder is preferably 1 to 100 $m^2/g$, more preferably 5 to 70 $m^2/g$, and yet more preferably 10 to 65 $m^2/g$. It is preferable if the specific surface area is in the range of 1 to 100 $m^2/g$, since a suitable surface roughness can be obtained, and dispersion can be carried out using a desired amount of binder.

The oil absorption obtained using dibutyl phthalate (DBP) is preferably 5 to 100 mL/100 g, more preferably 10 to 80 mL/100 g, and yet more preferably 20 to 60 mL/100 g.

The specific gravity is preferably 1 to 12, and more preferably 3 to 6. The tap density is preferably 0.05 to 2 g/mL, and more preferably 0.2 to 1.5 g/mL. When the tap density is in the range of 0.05 to 2 g/mL, there is little scattering of particles, the operation is easy, and there tends to be little sticking to equipment.

The pH of the non-magnetic powder is preferably 2 to 11, and particularly preferably 6 to 9. When the pH is in the range of 2 to 11, the coefficient of friction does not increase as a result of high temperature and high humidity or release of a fatty acid.

The water content of the non-magnetic powder is preferably 0.1 to 5 wt %, more preferably 0.2 to 3 wt %, and yet more preferably 0.3 to 1.5 wt %. It is preferable if the water content is in the range of 0.1 to 5 wt %, since dispersion is good, and the viscosity of a dispersed coating solution becomes stable.

The ignition loss is preferably 20 wt % or less, and a small ignition loss is preferable.

When the non-magnetic powder is an inorganic powder, the Mohs hardness thereof is preferably in the range of 4 to 10. When the Mohs hardness is in the range of 4 to 10, it is possible to guarantee the durability. The amount of stearic acid absorbed by the non-magnetic powder is 1 to 20 µmol/$m^2$, and preferably 2 to 15 µmol/$m^2$.

The heat of wetting of the non-magnetic powder in water at 25° C. is preferably in the range of 20 to 60 µJ/$cm^2$ (200 to 600 erg/$cm^2$). It is possible to use a solvent that gives a heat of wetting in this range.

The number of water molecules on the surface at 100° C. to 400° C. is suitably 1 to 10/100 Å. The pH at the isoelectric point in water is preferably between 3 and 9.

The surface of the non-magnetic powder is preferably subjected to a surface treatment with $Al_2O_3$, $SiO_2$, $TiO_2$, $ZrO_2$, $SnO_2$, $Sb_2O_3$, or ZnO. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface-treated layer may be obtained by co-precipitation, or a method can be employed in which the surface is firstly treated with alumina and the surface thereof is then treated with silica, or vice versa. The surface-treated layer may be formed as a porous layer depending on the intended purpose, but it is generally preferable for it to be uniform and dense.

Specific examples of the non-magnetic powder used in the non-magnetic layer in the present invention include Nanotite (manufactured by Showa Denko K.K.), HIT-100 and ZA-G1 (manufactured by Sumitomo Chemical Co., Ltd.), DPN-250, DPN-250BX, DPN-245, DPN-270BX, DPB-550BX, and DPN-550RX (manufactured by Toda Kogyo Corp.), titanium oxide TTO-51B, TTO-55A, TTO-55B, TTO-55C, TTO-55S, TTO-55D, and SN-100, MJ-7, and α-iron oxide E270, E271, and E300 (manufactured by Ishihara Sangyo Kaisha Ltd.), titanium oxide STT-4D, STT-30D, STT-30, and STT-65C (manufactured by Titan Kogyo Kabushiki Kaisha), MT-100S, MT-100T, MT-150W, MT-500B, MT-600B, MT-100F, and MT-500HD (manufactured by Tayca Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), 100A, and 500A (manufactured by Ube Industries, Ltd.), Y-LOP (manufactured by Titan Kogyo Kabushiki Kaisha), and calcined products thereof. Particularly preferred non-magnetic powders are titanium dioxide and α-iron oxide.

By mixing carbon black with the non-magnetic powder, the surface electrical resistance of the non-magnetic layer can be reduced, the light transmittance can be decreased, and a desired μVickers hardness can be obtained. The μVickers hardness of the non-magnetic layer is preferably 25 to 60 kg/mm$_2$, and is more preferably 30 to 50 kg/mm$^2$ in order to adjust the head contact, and can be measured using a thin film hardness meter (HMA-400 manufactured by NEC Corporation) with, as an indentor tip, a triangular pyramidal diamond needle having a tip angle of 80° and a tip radius of 0.1 μm. The light transmittance is generally standardized such that the absorption of infrared rays having a wavelength of on the order of 900 nm is 3% or less and, in the case of, for example, VHS magnetic tapes, 0.8% or less. Because of this, furnace black for rubber, thermal black for rubber, carbon black for coloring, acetylene black, etc. can be used.

The specific surface area of the carbon black used in the non-magnetic layer in the present invention is preferably 100 to 500 m$^2$/g, and more preferably 150 to 400 m$^2$/g, and the DBP oil absorption thereof is preferably 20 to 400 mL/100 g, and more preferably 30 to 200 mL/100 g. The particle size of the carbon black is preferably 5 to 80 nm, more preferably 10 to 50 nm, and yet more preferably 10 to 40 nm. The pH of the carbon black is preferably 2 to 10, the water content thereof is preferably 0.1% to 10%, and the tap density is preferably 0.1 to 1 g/mL.

Specific examples of the carbon black that can be used in the non-magnetic layer in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, and MA-600 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbian Carbon Co.), and Ketjen Black EC (manufactured by Akzo).

The carbon black may be surface treated using a dispersant or grafted with a resin, or part of the surface thereof may be converted into graphite. Prior to adding carbon black to a coating solution, the carbon black may be predispersed with a binder. The carbon black is preferably used in a range that does not exceed 50 wt % of the above-mentioned non-magnetic powder and in a range that does not exceed 40 wt % of the total weight of the non-magnetic layer. These types of carbon black may be used singly or in combination. The carbon black that can be used in the non-magnetic layer of the present invention can be selected by referring to, for example, the 'Kabon Burakku Binran (Carbon Black Handbook) (edited by the Carbon Black Association of Japan).

It is also possible to add an organic powder to the non-magnetic layer, depending on the intended purpose. Examples of such an organic powder include an acrylic styrene resin powder, a benzoguanamine resin powder, a melamine resin powder, and a phthalocyanine pigment, but a polyolefin resin powder, a polyester resin powder, a polyamide resin powder, a polyimide resin powder, and a polyfluoroethylene resin can also be used. Production methods such as those described in JP-A-62-18564 and JP-A-60-255827 may be used.

The binder resin, lubricant, dispersant, additive, solvent, dispersion method, and others for the non-magnetic layer may employ those of the magnetic layer. In particular, with regard to the amount and the type of binder resin, the amounts of additive and dispersant added, and the types thereof, known techniques related to the magnetic layer may be employed.

4. Non-magnetic Support

With regard to the non-magnetic support that can be used in the present invention, known biaxially stretched films such as polyethylene terephthalate, polyethylene naphthalate, polyamide, polyamideimide, and aromatic polyamide can be used. Among these, polyethylene terephthalate, polyethylene naphthalate, and polyamide are preferred.

These supports may be subjected in advance to a corona discharge treatment, a plasma treatment, a treatment for enhancing adhesion, a thermal treatment, etc. The non-magnetic support that can be used in the present invention preferably has a surface roughness such that its center plane average surface roughness Ra is in the range of 3 to 10 nm for a cutoff value of 0.25 mm.

5. Smoothing Layer

The magnetic recording medium of the present invention may be provided with a smoothing layer. The smoothing layer referred to here is a layer for burying projections on the surface of the non-magnetic support; it is provided between the non-magnetic support and the magnetic layer when the magnetic recording medium is provided with the magnetic layer on the non-magnetic support, and it is provided between the non-magnetic support and the non-magnetic layer when the magnetic recording medium is provided with the non-magnetic layer and the magnetic layer in that order on the non-magnetic support.

The smoothing layer can be formed by curing a radiation curable compound by exposure to radiation. The radiation curable compound referred to here is a compound having the property of polymerizing or crosslinking when irradiated with radiation such as ultraviolet rays or an electron beam, thus increasing the molecular weight and carrying out curing.

6. Backcoat Layer

In general, there is a strong requirement for magnetic tapes for recording computer data to have better repetitive transport properties than video tapes and audio tapes. In order to maintain such high storage stability, a backcoat layer can be provided on the surface of the non-magnetic support opposite to the surface where the non-magnetic layer and the magnetic layer are provided. As a coating solution for the backcoat layer, a binder and a particulate component such as an abrasive or an antistatic agent are dispersed in an organic solvent. As a granular component, various types of inorganic pigment or carbon black may be used. As the binder, a resin such as nitrocellulose, a phenoxy resin, a vinyl chloride resin, or a polyurethane can be used singly or in combination.

7. Layer Structure

In the constitution of the magnetic recording medium used in the present invention, the thickness of the smoothing layer is preferably in the range of 0.3 to 1.0 μm. Furthermore, the thickness of the non-magnetic support is preferably 3 to 80 μm. Moreover, when an adhesive layer is provided between the non-magnetic support and the non-magnetic layer or the magnetic layer, the thickness of the adhesive layer is preferably 0.01 to 0.8 μm, and more preferably 0.02 to 0.6 μm. Furthermore, the thickness of the backcoat layer provided on the surface of the non-magnetic support opposite to the surface where the non-magnetic layer and the magnetic layer are provided is preferably 0.1 to 1.0 μm, and more preferably 0.2 to 0.8 μm.

The thickness of the magnetic layer is optimized according to the saturation magnetization and the head gap of the magnetic head and the bandwidth of the recording signal, but it is preferably 0.01 to 0.10 μm, more preferably 0.02 to 0.08 μm, and yet more preferably 0.03 to 0.08 μm. The percentage variation in thickness of the magnetic layer is preferably ±50% or less, and more preferably ±40% or less. The magnetic layer can be at least one layer, but it is also possible to provide two or more separate layers having different magnetic properties, and a known configuration for a multilayer magnetic layer can be employed.

The thickness of the non-magnetic layer in the present invention is preferably 0.2 to 3.0 μm, more preferably 0.3 to 2.5 μm, and yet more preferably 0.4 to 2.0 μm. The non-magnetic layer of the magnetic recording medium of the present invention exhibits its effect if it is substantially non-magnetic, but even if it contains a small amount of a magnetic substance as an impurity or intentionally, if the effects of the present invention are exhibited the constitution can be considered to be substantially the same as that of the magnetic recording medium of the present invention. 'Substantially the same' referred to here means that the non-magnetic layer has a residual magnetic flux density of 10 T·m (100 G) or less or a coercive force of 7.96 kA/m (100 Oe) or less, and preferably has no residual magnetic flux density and no coercive force.

8. Production Method

A process for producing a magnetic layer coating solution for the magnetic recording medium used in the present invention comprises at least a kneading step, a dispersing step and, optionally, a blending step that is carried out prior to and/or subsequent to the above-mentioned steps. Each of these steps may be composed of two or more separate stages. All materials, including the non-magnetic powder, the binder, the carbon black, the abrasive, the antistatic agent, the lubricant, the solvent, and the ferromagnetic powder such as the ferromagnetic hexagonal ferrite powder, the ferromagnetic metal powder, etc. used in the present invention may be added in any step from the beginning or during the course of the step. The addition of each material may be divided across two or more steps. For example, a polyurethane can be divided and added in a kneading step, a dispersing step, and a blending step for adjusting the viscosity after dispersion. To attain the object of the present invention, a conventionally known production technique may be employed as a part of the steps. In the kneading step, it is preferable to use a powerful kneading machine such as an open kneader, a continuous kneader, a pressure kneader, or an extruder. When a kneader is used, all or a part of the binder (preferably 30 wt % or above of the entire binder) and the magnetic powder or the non-magnetic powder are kneaded at 15 to 500 parts by weight relative to 100 parts by weight of the ferromagnetic powder. Details of these kneading treatments are described in JP-A-1-106338 and JP-A-1-79274. For the dispersion of the magnetic layer solution and a non-magnetic layer solution, glass beads may be used. As such glass beads, a dispersing medium having a high specific gravity such as zirconia beads, titania beads, or steel beads is suitably used. An optimal particle size and packing density of these dispersing media is used. A known disperser can be used.

The process for producing the magnetic recording medium of the present invention includes, for example, coating the surface of a moving non-magnetic support with a magnetic layer coating solution so as to give a predetermined coating thickness. A plurality of magnetic layer coating solutions can be applied successively or simultaneously in multilayer coating, and a lower non-magnetic layer coating solution and an upper magnetic layer coating solution can also be applied successively or simultaneously in multilayer coating. As coating equipment for applying the above-mentioned magnetic layer coating solution or the lower non-magnetic layer coating solution, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, etc. can be used. With regard to these, for example, 'Saishin Kotingu Gijutsu' (Latest Coating Technology) (May 31, 1983) published by Sogo Gijutsu Center can be referred to.

In the case of a magnetic tape, the coated layer of the magnetic layer coating solution is subjected to a magnetic field alignment treatment in which the ferromagnetic powder contained in the coated layer of the magnetic layer coating solution is aligned in the longitudinal direction using a cobalt magnet or a solenoid. In the case of a disk, although sufficient isotropic alignment can sometimes be obtained without using an alignment device, it is preferable to employ a known random alignment device such as, for example, arranging obliquely alternating cobalt magnets or applying an alternating magnetic field with a solenoid. The isotropic alignment referred to here means that, in the case of a fine ferromagnetic metal powder, in general, in-plane two-dimensional random is preferable, but it can be three-dimensional random by introducing a vertical component. In the case of a hexagonal ferrite, in general, it tends to be in-plane and vertical three-dimensional random, but in-plane two-dimensional random is also possible. By using a known method such as magnets having different poles facing each other so as to make vertical alignment, circumferentially isotropic magnetic properties can be introduced. In particular, when carrying out high density recording, vertical alignment is preferable. Furthermore, circumferential alignment may be employed using spin coating.

It is preferable for the drying position for the coating to be controlled by controlling the drying temperature and blowing rate and the coating speed; it is preferable for the coating speed to be 20 to 1,000 m/min and the temperature of drying air to be 60° C. or higher, and an appropriate level of pre-drying may be carried out prior to entering a magnet zone.

After drying is carried out, the coated layer is subjected to a surface smoothing treatment. The surface smoothing treatment employs, for example, super calender rolls, etc. By carrying out the surface smoothing treatment, cavities formed by removal of the solvent during drying are eliminated, thereby increasing the packing ratio of the ferromagnetic powder in the magnetic layer, and a magnetic recording medium having high electromagnetic conversion characteristics can thus be obtained.

With regard to calendering rolls, rolls of a heat-resistant plastic such as epoxy, polyimide, polyamide, or polyamideimide are used. It is also possible to carry out a treatment with metal rolls. The magnetic recording medium of the present invention preferably has a surface center plane average roughness in the range of 0.1 to 4.0 nm for a cutoff value of 0.25 mm, and more preferably 0.5 to 3.0 nm, which is extremely smooth. As a method therefor, a magnetic layer formed by selecting a specific ferromagnetic powder and binder as described above is subjected to the above-mentioned calendering treatment. With regard to calendering conditions, the calender roll temperature is preferably in the range of 60° C. to 100° C., more preferably in the range of 70° C. to 100° C., and particularly preferably in the range of 80° C. to 100° C., and the pressure is preferably in the range of 100 to 500 kg/cm, more preferably in the range of 200 to 450 kg/cm, and particularly preferably in the range of 300 to 400 kg/cm.

As thermal shrinkage reducing means, there is a method in which a web is thermally treated while handling it with low tension, and a method (thermal treatment) involving thermal treatment of a tape when it is in a layered configuration such as in bulk or installed in a cassette, and either can be used. In the former method, the effect of the imprint of projections of the surface of the backcoat layer is small, but the thermal shrinkage cannot be greatly reduced. On the other hand, the latter thermal treatment can improve the thermal shrinkage greatly, but when the effect of the imprint of projections of the surface of the backcoat layer is strong, the surface of the magnetic layer is roughened, and this causes the output to decrease and the noise to increase. In particular, a high output and low noise magnetic recording medium can be provided for the magnetic recording medium accompanying the thermal treatment. The magnetic recording medium thus obtained can be cut to a desired size using a cutter, a stamper, etc. before use.

9. Physical Properties

The saturation magnetic flux density of the magnetic layer of the magnetic recording medium used in the present invention is preferably 100 to 300 mT (1,000 to 3,000 G). The coercive force (Hc) of the magnetic layer is preferably 143.3 to 318.4 kA/m (1,800 to 4,000 Oe), and more preferably 159.2 to 278.6 kA/m (2,000 to 3,500 Oe). It is preferable for the coercive force distribution to be narrow, and the SFD and SFDr are preferably 0.6 or less, and more preferably 0.2 or less.

The coefficient of friction, with respect to a head, of the magnetic recording medium used in the present invention is preferably 0.5 or less at a temperature of −10° C. to 40° C. and a humidity of 0% to 95%, and more preferably 0.3 or less. The electrostatic potential is preferably −500 V to +500 V. The modulus of elasticity of the magnetic layer at an elongation of 0.5% is preferably 0.98 to 19.6 GPa (100 to 2,000 kg/mm$^2$) in each direction within the plane, and the breaking strength is preferably 98 to 686 MPa (10 to 70 kg/mm$^2$); the modulus of elasticity of the magnetic recording medium is preferably 0.98 to 14.7 GPa (100 to 1,500 kg/mm$^2$) in each direction within the plane, the residual elongation is preferably 0.5% or less, and the thermal shrinkage at any temperature up to and including 100° C. is preferably 1% or less, more preferably 0.5% or less, and most preferably 0.1% or less.

The glass transition temperature of the magnetic layer (the maximum point of the loss modulus in a dynamic viscoelasticity measurement at 110 Hz) is preferably 50° C. to 180° C., and that of the non-magnetic layer is preferably 0° C. to 180° C. The loss modulus is preferably in the range of $1 \times 10^7$ to $8 \times 10^8$ Pa ($1 \times 10^8$ to $8 \times 10^9$ dyne/cm$^2$), and the loss tangent is preferably 0.2 or less. It is preferable if the loss tangent is 0.2 or less, since the problem of tackiness hardly occurs. These thermal properties and mechanical properties are preferably substantially identical to within 10% in each direction in the plane of the medium.

Residual solvent in the magnetic layer is preferably 100 mg/m$^2$ or less, and more preferably 10 mg/m$^2$ or less. The porosity of the coating layer is preferably 30 vol % or less for both the non-magnetic layer and the magnetic layer, and more preferably 20 vol % or less. In order to achieve a high output, the porosity is preferably small, but there are cases in which a certain value should be maintained depending on the intended purpose. For example, in the case of disk media where repetitive use is considered to be important, a large porosity is often preferable from the point of view of storage stability.

The center plane surface roughness Ra of the magnetic layer is preferably 4.0 nm or less, more preferably 3.0 nm or less, and yet more preferably 2.0 nm or less, when measured using a digital optical, profimeter (TOPO-3D, manufactured by WYKO) with the Mirau method. The maximum height $SR_{max}$ of the magnetic layer is preferably 0.5 μm or less, the ten-point average roughness SRz is 0.3 μm or less, the center plane peak height SRp is 0.3 μm or less, the center plane valley depth SRv is 0.3 μm or less, the center plane area factor SSr is 20% to 80%, and the average wavelength Sλa is 5 to 300 μm. It is possible to set the number of surface projections on the magnetic layer having a size of 0.01 to 1 μm at any level in the range of 0 to 2,000 projections per 100 μm$^2$, and by so doing the electromagnetic conversion characteristics and the coefficient of friction can be optimized, which is preferable. They can be controlled easily by controlling the surface properties of the support by means of a filler, the particle size and the amount of a powder added to the magnetic layer, and the shape of the roll surface in the calendering process. The curl is preferably within ±3 mm.

When the magnetic recording medium of the present invention has a non-magnetic layer and a magnetic layer, it can easily be anticipated that the physical properties of the non-magnetic layer and the magnetic layer can be varied according to the intended purpose. For example, the elastic modulus of the magnetic layer can be made high, thereby improving the storage stability, and at the same time the elastic modulus of the non-magnetic layer can be made lower than that of the magnetic layer, thereby improving the head contact of the magnetic recording medium.

A head used for playback of signals recorded magnetically on the magnetic recording medium of the present invention is not particularly limited, but an MR head is preferably used. When an MR head is used for playback of the magnetic recording medium of the present invention, the MR head is not particularly limited and, for example, a GMR head or a TMR head may be used. A head used for magnetic recording is not particularly limited, but it is preferable for the saturation magnetization to be 1.0 T or more, and more preferably 1.5 T or more.

In accordance with the present invention, a magnetic recording medium having improved storage stability, coating smoothness, electromagnetic conversion characteristics, and transport durability can be obtained.

EXAMPLES

The present invention is explained more specifically below by reference to Examples, but the present invention should not be construed as being limited thereby. 'Parts' in the Examples means 'parts by weight' unless otherwise specified.

Synthetic Example of Polyurethane

In a vessel equipped with a reflux condenser and a stirrer and flushed with nitrogen, a diol component having the composition shown in Table 1 and a reaction catalyst were dissolved in cyclohexanone at 60° C. under a flow of nitrogen gas to give a 50% solution. A diisocyanate component shown in Table 1 was further added thereto, and a reaction was carried out at 90° C. for 6 hours to give each of the polyurethane resin solutions A to P.

The weight-average molecular weight and the weight-average molecular weight/number-average molecular weight ratio of the polyurethanes obtained are given in Table 1.

The weight-average molecular weight of the polyurethane was determined on a polystyrene standard basis using DMF (dimethylformamide) solvent.

Preparation of Lower Layer Non-magnetic Coating Solution (Non-magnetic Layer Coating Solution)

85 parts of α-$Fe_2O_3$ (average particle size 0.15 μm; $S_{BET}$ 52 m$^2$/g; surface treatment with $Al_2O_3$ and $SiO_2$; pH 6.5 to 8.0) was ground in an open kneader for 10 minutes, and then kneaded for 60 minutes with a     7.5 parts

TABLE 1

| Polyurethane | Diol and diisocyanate used in polyurethane synthesis (molar ratio) | | | | | | | Catalyst (wt %) | Mw | Mw/Mn | Urethane group conc. mol/g |
|---|---|---|---|---|---|---|---|---|---|---|---|
| | Diol | | | | | Diisocyanate | | | | | |
| A | Polyester A | 34.5 | Polyester B | 2.0 | MPD | 18.3 | MDI | 45.2 | DBTDL 1.5 | 218,000 | 1.8 | 3.5 |
| B | Polyester A | 30.6 | Polyester B | 2.0 | MPD | 17.9 | MDI | 49.5 | DBTDL 4.2 | 398,000 | 2.2 | 3.9 |
| C | Polyester A | 48.1 | Polyester B | 1.9 | MPD | 15.4 | MDI | 34.6 | DBTDL 3.8 | 208,000 | 1.9 | 2.5 |
| D | Polyester C | 6.4 | Polyester B | 1.3 | NPG | 47.8 | MDI | 44.6 | DBTDL 1.5 | 221,000 | 1.8 | 4.5 |
| E | Polyester A | 31.3 | Polyester B | 2.0 | MPD | 18.3 | MDI | 48.3 | DBTDL 1.5 | 219,000 | 1.8 | 3.8 |
| F | Polyester A | 33.6 | Polyester B | 2.1 | MPD | 19.6 | MDI | 44.6 | DBTDL 0.0 | 148,000 | 1.7 | 3.5 |
| G | Polyester A | 30.5 | Polyester B | 1.9 | DMH | 17.8 | MDI | 49.8 | DBTDL 4.2 | 447,000 | 2.3 | 3.8 |
| H | Polyether A | 22.7 | Polyester B | 2.1 | BPA-PO | 26.3 | MDI | 48.9 | DBTDL 1.5 | 205,000 | 1.7 | 2.8 |
| I | Polyether A | 28.8 | Polyester B | 2.4 | BPA-PO | 19.2 | MDI | 49.6 | DBTDL 4.2 | 465,000 | 2.2 | 2.7 |
| J | Polyether A | 28.5 | Polyester B | 2.7 | BPA-PO | 25.2 | MDI | 43.6 | DBTDL 1.5 | 216,000 | 2.2 | 2.3 |
| K | Polyether B | 3.5 | Polyester B | 2.2 | BPA-PO | 47.5 | MDI | 46.8 | DBTDL 1.5 | 210,000 | 1.8 | 3.0 |
| L | Polyether A | 24.7 | Polyester B | 2.3 | BPA-PO | 28.6 | MDI | 44.3 | DBTDL 0.0 | 138,000 | 1.8 | 2.4 |
| M | Polyether A | 22.3 | Polyester B | 2.1 | HBpA | 25.8 | MDI | 49.8 | DBTDL 4.2 | 472,000 | 2.1 | 3.1 |
| N | Polyester D | 30.8 | Polyester B | 2.0 | DMH | 20.0 | MDI | 47.2 | DBTDL 1.5 | 226,000 | 1.8 | 3.7 |
| O | Polyester E | 30.8 | Polyester B | 2.0 | HD | 18.0 | MDI | 49.2 | DBTDL 1.5 | 221,000 | 1.8 | 3.6 |
| P | Polyether C | 28.5 | Polyester B | 2.1 | PPG250 | 19.6 | MDI | 49.8 | DBTDL 2.5 | 215,000 | 1.9 | 2.8 |

Descriptions in the table are as follows.
Polyester A: isophthalic acid/2,2-dimethyl-1,3-propanediol = 1/2 mole reaction product (molecular weight 338)
Polyester B: sodium sulfoisophthalate/2,2-dimethyl-1,3-propanediol = 1/2 mole reaction product (molecular weight 440)
Polyester C: adipic acid/1,4-butanediol = 2/3 mole reaction product (molecular weight 491)
Polyester D: adipic acid/2,2-dimethyl-1,3-propanediol = 1/2 mole reaction product (molecular weight 318)
Polyester E: adipic acid/cyclohexanedimethanol = 1/2 mole reaction product (molecular weight 398)
Polyether A: bisphenol A 6 mole propylene oxide adduct (molecular weight 577)
Polyether B: polytetramethylene glycol (molecular weight 528)
Polyether C: polypropylene glycol (molecular weight 600)
DMH: 2-ethyl-2-butyl-1,3-propanediol (molecular weight 160)
NPG: neopentyl glycol (molecular weight 104)
MPD: 3-methyl-1,5-pentanediol (molecular weight 118)
HBpA: hydrogenated bisphenol A (molecular weight 240)
BPA-PO: bisphenol A 2 mole propylene oxide adduct (molecular weight 344)
HD: 1,6-hexanediol (molecular weight 118)
PPG250: polypropylene glycol (molecular weight 250)
MDI: 4,4'-diphenylmethane diisocyanate (molecular weight 250)
DBTDL: dibutyl tin dilaurate

Example 1

Preparation of Upper Layer Magnetic Coating Solution (Magnetic Layer Coating Solution)

100 parts of a magnetic substance shown in Table 2 was ground in an open kneader for 10 minutes, and then kneaded for 60 minutes with 15 parts (solids content) of polyurethane resin solution A. Subsequently, an abrasive ($Al_2O_3$, particle size 0.3 μm)     2 parts carbon black (particle size 40 μm)     2 parts, and
methyl ethyl ketone/toluene = 1/1     200 parts were added, and the mixture was dispersed in a sand mill for 360 minutes. To this were added butyl stearate     2 parts
stearic acid     1 part, and
cyclohexanone     50 parts, and after stirring the mixture for a further 20 minutes, it was filtered using a filter having an average pore size of 1 μm to give a magnetic coating solution.

-continued compound obtained by adding sodium hydroxyethylsulfonate to a copolymer of vinyl chloride/vinyl acetate/glycidyl methacrylate = 86/9/5 ($SO_3Na$ = 6 × 10$^{-5}$ eq/g, epoxy = 10$^{-3}$ eq/g, Mw 30,000)

polyurethane resin A     10 parts (solids content) and
cyclohexanone     60 parts, subsequently,
methyl ethyl ketone/cyclohexanone = 6/4     200 parts was added, and the mixture was dispersed in a sand mill for 120 minutes. To this were added butyl stearate     2 parts
stearic acid     1 part, and
methyl ethyl ketone     50 parts, and after stirring the mixture for a further 20 minutes, it was filtered using a filter having an average pore size of 1 μm to give a lower layer non-magnetic coating solution.

The surface of a 7 μm thick polyethylene terephthalate support was coated by means of a wire-wound bar with a sulfonic acid-containing polyester resin at a dry thickness of 0.1 μm as an adhesive layer.

Subsequently, using reverse roll simultaneous multilayer coating, the lower layer non-magnetic coating solution was applied and immediately after this the upper layer magnetic coating solution was applied so that the dry thicknesses would be 1.5 μm and 0.1 μm respectively. Before the magnetic coating solution had dried, the non-magnetic support coated with the magnetic coating solution was subjected to magnetic field alignment using a 5,000 G Co magnet and a 4,000 G solenoid magnet, and the coating was then subjected to a calender treatment employing a metal roll-metal roll-metal roll-metal roll-metal roll-metal roll-metal roll combination (speed 100 m/min, line pressure 300 kg/cm, temperature 90° C.), and then slit to a width of ½ inch.

Examples 2 to 16 and Comparative Examples 1 to 5

Magnetic recording tapes were produced by the same method as in Example 1 except that the polyurethane resin and the magnetic substance for the upper layer magnetic coating solution were changed to those shown in Table 2.

The magnetic recording media thus obtained were evaluated by the following methods.

(1) Smoothness

The number of projections of 10 nm to 20 nm was determined by scanning an area of 30 μm×30 μm using a Nanoscope II manufactured by Digital Instruments at a tunneling current of 10 nA and a bias voltage of 400 mV, and expressed as a relative value where the value for Comparative Example 1 was 100.

(2) Electromagnetic Conversion Characteristics

Measurement was carried out using a ½ inch linear system with a fixed head. The head/tape relative speed was 10 m/sec. Recording employed a saturation magnetization 1.4 T MIG head (track width 18 μm), and the recording current was set at an optimum current for each tape.

The playback head employed was an anisotropic MR head (A-MR) with an element thickness of 25 nm and a shield gap of 0.2 μm.

A signal at a recording wavelength of 0.2 μm was recorded, the playback signal was subjected to frequency analysis by means of a spectrum analyzer manufactured by Shibasoku Co., Ltd., and the ratio of the carrier signal output (wavelength 0.2 μm) to the integrated noise of the entire spectral region was used as the S/N ratio, and was expressed as a relative value where the value of Comparative Example 1 was 0 dB.

(3) Repetitive Sliding Durability

A tape was made to slide at a sliding speed of 2 m/sec repeatedly for 10,000 passes under an environment at 40° C. and 10% RH with the magnetic layer surface in contact with an AlTiC cylindrical rod at a load of 100 g (T1), and tape damage was evaluated using the rankings below.

Excellent: slightly scratched, but area without scratches was larger.

Good: area with scratches was larger than area without scratches.

Poor: magnetic layer completely peeled off.

(4) Storage Stability 600 m of a tape was stored at 60° C. and 90% for 2 weeks while wound in a reel for an LTO-G3 cartridge. The sliding durability of the tape after storage was measured by the same method as in (3).

TABLE 2

| | Polyurethane | Mw | Mn | Urethane group conc. mmol/g | Magnetic substance Type | Magnetic substance Size | Smoothness | Electromagnetic conversion characteristics | Repetitive sliding durability | Storage stability |
|---|---|---|---|---|---|---|---|---|---|---|
| Ex. 1 | A | 218,000 | 1.8 | 3.5 | Acicular ferromagnetic powder | Major axis length 35 nm | 75 | 0.7 | Excellent | Excellent |
| Ex. 2 | B | 398,000 | 2.2 | 3.9 | Acicular ferromagnetic powder | Major axis length 35 nm | 86 | 0.4 | Excellent | Excellent |
| Ex. 3 | C | 208,000 | 1.9 | 2.5 | Acicular ferromagnetic powder | Major axis length 35 nm | 73 | 0.8 | Excellent | Excellent |
| Ex. 4 | D | 221,000 | 1.8 | 4.5 | Acicular ferromagnetic powder | Major axis length 35 nm | 86 | 0.4 | Excellent | Excellent |
| Ex. 5 | E | 219,000 | 1.8 | 3.8 | Acicular ferromagnetic powder | Major axis length 35 nm | 74 | 0.7 | Excellent | Excellent |
| Ex. 6 | H | 205,000 | 1.7 | 2.8 | Acicular ferromagnetic powder | Major axis length 35 nm | 75 | 0.7 | Excellent | Excellent |
| Ex. 7 | J | 216,000 | 2.2 | 2.3 | Acicular ferromagnetic powder | Major axis length 35 nm | 80 | 0.6 | Excellent | Excellent |
| Ex. 8 | K | 210,000 | 1.8 | 3.0 | Acicular ferromagnetic powder | Major axis length 35 nm | 77 | 0.7 | Excellent | Excellent |
| Ex. 9 | N | 226,000 | 1.8 | 3.7 | Acicular ferromagnetic powder | Major axis length 35 nm | 84 | 0.4 | Excellent | Excellent |
| Ex. 10 | O | 221,000 | 1.8 | 3.6 | Acicular ferromagnetic powder | Major axis length 35 nm | 85 | 0.4 | Excellent | Excellent |
| Ex. 11 | P | 215,000 | 1.9 | 2.8 | Acicular ferromagnetic powder | Major axis length 35 nm | 87 | 0.4 | Excellent | Excellent |
| Ex. 12 | A | 218,000 | 1.8 | 3.5 | Acicular ferromagnetic powder | Major axis length 20 nm | 65 | 1.0 | Excellent | Excellent |
| Ex. 13 | A | 218,000 | 1.8 | 3.5 | Acicular ferromagnetic powder | Major axis length 50 nm | 85 | 0.4 | Excellent | Excellent |
| Ex. 14 | B | 398,000 | 2.2 | 3.9 | Hexagonal tabular ferrite powder | Particle size 10 nm | 65 | 1.0 | Excellent | Excellent |
| Ex. 15 | B | 398,000 | 2.2 | 3.9 | Hexagonal tabular ferrite powder | Particle size 50 nm | 78 | 0.6 | Excellent | Excellent |
| Ex. 16 | A | 218,000 | 1.8 | 3.5 | Spherical iron nitride powder | Particle size 10 nm | 65 | 1.0 | Excellent | Excellent |
| Ex. 17 | A | 218,000 | 1.8 | 3.5 | Spherical iron nitride powder | Particle size 50 nm | 80 | 0.6 | Excellent | Excellent |
| Comp. Ex. 1 | F | 148,000 | 1.7 | 3.5 | Acicular ferromagnetic powder | Major axis length 35 nm | 100 | 0.0 | Good | Poor |
| Comp. Ex. 2 | G | 447,000 | 2.3 | 3.8 | Acicular ferromagnetic powder | Major axis length 35 nm | 135 | −1.0 | Good | Good |
| Comp. Ex. 3 | I | 465,000 | 2.2 | 2.7 | Acicular ferromagnetic powder | Major axis length 35 nm | 150 | −1.4 | Good | Good |
| Comp. Ex. 4 | L | 138,000 | 1.8 | 2.4 | Acicular ferromagnetic powder | Major axis length 35 nm | 94 | 0.2 | Good | Poor |

TABLE 2-continued

| | Polyurethane | Mw | Mw/Mn | Urethane group conc. mmol/g | Magnetic substance Type | Magnetic substance Size | Smoothness | Electromagnetic conversion characteristics | Repetitive sliding durability | Storage stability |
|---|---|---|---|---|---|---|---|---|---|---|
| Comp. Ex. 5 | M | 472,000 | 2.1 | 3.1 | Acicular ferromagnetic powder | Major axis length 35 nm | 155 | −1.6 | Good | Good |

The magnetic substances shown in Table 2 are as follows.
Acicular ferromagnetic powder Composition: Fe 89 atm %, Co 5 atm %, Y 6 atm %, Hc: 175 kA/m (2,200 Oe), BET specific surface area: 70 m$^2$/g, acicular ratio: 3.5, σs: 125 A · m$^2$/kg (emu/g)
Hexagonal tabular ferrite powder Composition: Ba 91 atm %, Fe 8 atm %, Co 0.5 atm %, Zn 0.5 atm %, Hc: 175 kA/m (2,200 Oe), BET specific surface area: 55 m$^2$/g, tabular ratio: 3.5, σs: 51 A · m$^2$/kg (emu/g)
Spherical iron nitride powder Composition: Fe 88 atm %, N 8 atm %, Y 4 atm %, Hc: 175 kA/m (2,200 Oe), BET specific surface area: 56 m$^2$/g, σs: 100 A · m$^2$/kg (emu/g)

What is claimed is:

1. A magnetic recording medium comprising:
a non-magnetic support; and
at least one magnetic layer above the support, the magnetic layer comprising a ferromagnetic powder dispersed in a binder,
the binder comprising a polyurethane resin having a weight-average molecular weight of 200,000 to 400,000,
wherein the ferromagnetic powder is an acicular ferromagnetic substance having a major axis length of 20 to 50 nm, a tabular magnetic substance having a particle size of 10 to 50 nm, or a spherical or ellipsoidal magnetic substance having a diameter of 10 to 50 nm, and
wherein the polyurethane resin has a weight-average molecular weight (Mw)/number-average molecular weight (Mn) ratio Mw/Mn in the range of 1.0 to 2.5.

2. A magnetic recording medium comprising:
a non-magnetic support;
a non-magnetic layer above the support, the non-magnetic layer comprising a non-magnetic powder dispersed in a binder; and
at least one magnetic layer above the non-magnetic layer, the magnetic layer comprising a ferromagnetic powder dispersed in a binder,
the binder of the magnetic layer and/or the non-magnetic layer comprising a polyurethane resin having a weight-average molecular weight of 200,000 to 400,000,
wherein the ferromagnetic powder is an acicular ferromagnetic substance having a major axis length of 20 to 50 nm, a tabular magnetic substance having a particle size of 10 to 50 nm, or a spherical or ellipsoidal magnetic substance having a diameter of 10 to 50, and
wherein the polyurethane resin has a weight-average molecular weight (Mw)/number-average molecular weight (Mn) ratio Mw/Mn in the range 1.0 to 2.5.

3. The magnetic recording medium according to claim 1, wherein the polyurethane resin has a urethane group concentration of 2.3 mmol/g to 4.5 mmol/g.

4. The magnetic recording medium according to claim 1, wherein the polyurethane resin comprises an aliphatic diol having a branched side chain with two or more carbons.

5. The magnetic recording medium according to claim 1, wherein the polyurethane resin is a polyether polyurethane comprising a diol having a cyclic structure.

6. The magnetic recording medium according to claim 1, wherein the non-magnetic support is polyethylene terephthalate (PET) or polyethylene naphthalate (PEN).

7. The magnetic recording medium according to claim 1, wherein the non-magnetic support has a thickness of 3 to 80 μm.

8. The magnetic recording medium according to claim 1, wherein the non-magnetic support has a center plane average roughness on the side coated with the magnetic layer of 3 to 10 nm for a cutoff value of 0.25 mm.

9. The magnetic recording medium according to claim 1, wherein the magnetic layer has a thickness of 0.01 to 0.10 μm.

10. The magnetic recording medium according to claim 2, wherein the polyurethane resin has a urethane group concentration of 2.3 mmol/g to 4.5 mmol/g.

11. The magnetic recording medium according to claim 2, wherein the polyurethane resin comprises an aliphatic diol having a branched side chain with two or more carbons.

12. The magnetic recording medium according to claim 2, wherein the polyurethane resin is a polyether polyurethane comprising a diol having a cyclic structure.

13. The magnetic recording medium according to claim 2, wherein the non-magnetic support is polyethylene terephthalate (PET) or polyethylene naphthalate (PEN).

14. The magnetic recording medium according to claim 2, wherein the non-magnetic support has a thickness of 3 to 80 μm.

15. The magnetic recording medium according to claim 2, wherein the magnetic layer has a thickness of 0.01 to 0.10 μm.

16. The magnetic recording medium according to claim 2, wherein the non-magnetic layer has a thickness of 0.2 to 3.0 μm.

* * * * *